US005584642A

United States Patent [19]

Huntoon

[11] Patent Number: 5,584,642

[45] Date of Patent: Dec. 17, 1996

[54] REFUSE COLLECTION VEHICLE AND APPARATUS ASSOCIATED THEREWITH

[75] Inventor: Russell C. Huntoon, Sparks, Nev.

[73] Assignee: Automated Refuse Equipment, Inc., Reno, Nev.

[21] Appl. No.: 428,006

[22] Filed: Apr. 24, 1995

[51] Int. Cl.[6] .................... B65G 67/02

[52] U.S. Cl. .................... 414/525.2; 414/408; 414/505; 414/517

[58] Field of Search .................... 414/406–409, 414/525.1–525.6, 517, 501, 505, 486

[56] References Cited

U.S. PATENT DOCUMENTS

| | | | |
|---|---|---|---|
| 3,211,312 | 10/1965 | Miller | 414/406 |
| 3,232,463 | 2/1966 | Weir . | |
| 4,096,959 | 6/1978 | Schäffler | 414/408 |
| 4,113,125 | 9/1978 | Schiller | 414/406 |
| 4,892,454 | 1/1990 | Behling et al. | 414/406 |
| 4,948,323 | 8/1990 | Gasparini | 414/408 |
| 5,074,737 | 12/1991 | Pellegrini et al. | 414/406 |
| 5,122,025 | 6/1992 | Glomski | 414/486 |
| 5,205,698 | 4/1993 | Mezey | 414/406 |
| 5,288,196 | 2/1994 | Horning et al. | 414/407 |
| 5,316,430 | 5/1994 | Horning et al. | 414/407 |
| 5,344,273 | 9/1994 | Radlein | 414/409 |
| 5,427,496 | 6/1995 | Ratledge, Jr. et al. | 414/409 X |

FOREIGN PATENT DOCUMENTS

| | | | |
|---|---|---|---|
| 314238 | 5/1989 | European Pat. Off. | 414/406 |
| 388295 | 9/1990 | European Pat. Off. | 414/406 |

*Primary Examiner*—David A. Bucci
*Attorney, Agent, or Firm*—Bell, Seltzer, Park & Gibson, P.A.

[57] ABSTRACT

A refuse collection vehicle which has a refuse collection hopper mounted thereto, such that the hopper has a closed first end and an open second end and an opening located adjacent the first end for providing access to the hopper. A tailgate is connected to the hopper which, in conjunction with the hopper, defines with an inner cavity. The tailgate is movable between a closed position for covering the second end of the hopper and an open position for uncovering at least a portion of the second end of the hopper for emptying refuse therefrom. A divider panel is mounted within the hopper for generally horizontally dividing the inner cavity into an upper chamber and a lower chamber. A paddle is connected to the divider panel and is movable relative thereto to thereby change the relative volume of the upper and lower chambers. The paddle cooperates with the tailgate for selectively emptying at least one of the upper chamber and the lower chamber when the tailgate is in the open position.

39 Claims, 4 Drawing Sheets

REFUSE COLLECTION VEHICLE AND APPARATUS ASSOCIATED THEREWITH

FIELD OF THE INVENTION

The present invention relates to the field of refuse collection systems, and, more particularly, to refuse collection vehicles and apparatus associated with refuse collecting vehicles.

BACKGROUND OF THE INVENTION

The desire to reduce the cost and increase the ease and speed of refuse collection, in conjunction with improvements in automation techniques, has resulted in substantial changes in the collection of residential and commercial refuse. Most modern refuse collection systems include carts having wheels, which allow them to be rolled to the street curb, where they are lifted and dumped by a semi- or fully automated lift mechanism.

In conjunction with the trend toward increased efficiency there is a desire to improve the recycling of waste materials. To improve the collection process for recyclable waste, customers are being provided with separate containers for different wastes, or with refuse carts which are capable of segregating either two or more types of refuse, namely, recyclable and nonrecyclable waste or two or more different types of recyclable refuse, such as paper and plastic, examples of such containers may be seen in U.S. Pat. Nos. 4,715,767, 4,113,125 and Des. 343,490.

The use of divided refuse carts requires the corresponding refuse collection vehicle to be provided with a collection hopper which is divided into separate chambers. Advantageously, the separate chambers are designed for use with divided refuse carts so that the contents of the divided refuse cart fall into the proper chamber upon emptying of the cart into the vehicle. In such instances, the divided cart is lifted and emptied so that the refuse cart is accurately aligned above the truck, to ensure that the contents of the compartmentalized cart fall into the proper chamber in the truck so as to avoid cross-contamination.

Several problems have developed as a consequence of providing a divided collection hopper to receive two different types of refuse. One of the more common problems relates to compacting and retaining the waste within the separate chambers. Because of the different nature and characteristics of the refuse being collected within each of the chambers, different methods must be used to adequately compact and retain the refuse. For instance, the compacting pressure required to overcome plastic's tendency to retain its shape after it has been compacted is higher than the compacting pressure required to crush glass. As a result, when plastic and glass are placed into the same collection chamber, unless the plastic is adequately compressed, it will bubble or spill over the advancing packer blade into the other chamber, thereby contaminating the contents of the other chamber. However, sufficiently compacting the plastic to overcome its tendency to retain its shape results in crushing the glass received within the same chamber. Crushing the glass significantly reduces its ability to be recycled. An example of existing approaches which have not overcome this problem may be seen in U.S. Pat. Nos. 5,288,196 and 5,316,430 to Horning et al. These patents disclose a refuse truck having a packer or blade reciprocatingly located in respective upper and lower compartments.

An alternative approach was developed by the applicant in its prototype truck for the City of Visalia, Calif. This approach relied on a pair of separately driven packers, one for each the upper and lower compartments of the truck, cooperating through a pressure sequence valve, with a separately driven bucket and a separately driven blade. This prototype was cost prohibitive; therefore, Applicant subsequently developed a twin packer or compactor ram prototype which used a single actuator to drive a lower packer which was connected to and drove a similarly shaped upper packer. Applicant however found this second prototype to suffer various inadequacies.

Based on the inability of current technology to adequately retain the plastic without damaging the glass contained within the same chamber, collection companies are forced to choose among unsatisfactory alternatives of contamination of non-plastic refuse by the plastic spilling over the packer into the second chamber, or crushing glass refuse when plastic and paper are collected together in the same chamber. None of these alternatives fulfills the objective for separating the refuse collected in a cost effective manner.

A second problem with using a divided collection hopper is that the refuse truck can only remain on its route until one of the chambers is filled. Consequently, depending on the day of the week and the nature of the refuse to be collected, the refuse collection vehicle may be forced to make several trips to the landfill or to the recycling center to unload the full chamber while the other chamber remains relatively empty. In such situations, the use of a divided hopper not only increases the cost but also results in great inefficiency in the collection system. This is especially true on collection days when a recyclable collection is being made. Frequently the collection chamber receiving paper products, such as newspapers, will fill much more quickly than the chamber receiving the plastic and glass. As a result, efforts have been made to vary the size of the respective chambers within the hopper as collection routes or the types of refuse being collected change.

One approach to solve this problem is set forth in U.S. Pat. No. 5,122,025 to Glomski which discloses a refuse collection truck having a divided collection hopper. A dividing wall separating the two chambers is adjustable along parallel tracks to move the dividing wall to vary the relative size of the compartments. Movement of the divider wall is manually controlled by the operator. This approach however requires separate openings for each of the compartments, thereby requiring refuse to be separately dumped into each compartment at different locations along the hopper.

A third problem arises once the refuse has been collected within the divided hopper. One of the reasons for separating the refuse in a divided hopper is to be able to dump the separated refuse in different locations within a recycling center or a transfer station or other locations dedicated to different types of refuse. Therefore, it is necessary to be able to separately empty each of the chambers. Several different approaches to separately emptying the divided collection hopper have developed. For example U.S. Pat. No. 5,122,025 to Glomski discloses a refuse collection vehicle which requires a divider wall separating the chambers to be locked to allow separate emptying of one chamber while retaining the material in the second chamber. In this configuration, the refuse to be emptied first must always be loaded into the rearward chamber. U.S. Pat. No. 5,316,430 to Horning et al. discloses a refuse collection vehicle having a tailgate with separate, independently operating discharge doors. The doors must be manually opened and closed to separately discharge refuse from either of the chambers. Similarly, U.S.

Pat. No. 5,288,196 to Horning et al. discloses a refuse collection vehicle having a set of discharge doors wherein an inner discharge door overlays one chamber and a larger outer door overlies both chambers. To empty the upper chamber requires opening the outer door while the closed inner door retains the refuse in the lower chamber. To empty the lower chamber requires opening both the inner and the outer doors.

Based on the approaches currently available, collection companies are forced to either load the recyclables into various compartments in the order in which they are to be discharged, manually open and close separate discharge doors or open two doors to separately dump the contents of the collection chambers.

SUMMARY OF THE INVENTION

The present invention provides a refuse collection vehicle capable of receiving, compacting, and retaining refuse of different types in separate chambers of a divided hopper. In addition, preferred refuse collection vehicles of the invention are capable of varying the relative size of the chambers within the divided hopper and selectively discharging or emptying one or both of the chambers.

In one aspect a refuse collection vehicle of the present invention includes a refuse collection hopper mounted to the vehicle, which has a closed first end and an open second end, and a tailgate connected to the open second end of the hopper and at least one inner cavity in the hopper between the two ends. A divider panel is mounted within the hopper for horizontally dividing the inner cavity into an upper chamber and a lower chamber. The tailgate is movable between a closed position for covering the second end of the hopper and an open position for uncovering the second end of the hopper to empty refuse from at least one of the chambers. Preferably the collection hopper has an opening located adjacent the first end to deposit refuse into the inner cavity.

A paddle is connected to the divider panel and is movable between at least two positions to change the relative volumes of the upper and the lower chambers. Advantageously, the paddle also cooperates with the tailgate to selectively enable only one of the upper and lower chambers to be emptied or to enable both the upper and lower chambers to be simultaneously emptied when the tailgate is in the open position.

Preferably, the tailgate has a generally convexly curved configuration so as to provide additional volume to the inner cavity of the hopper. Desirably, the tailgate includes at least two sections wherein a first section is pivotally connected to the second end of the hopper and a second section is pivotally connected to the first section. This arrangement of the tailgate enables refuse to be selectively emptied from the first and second chambers either simultaneously or separately.

The paddle is preferably pivotally connected to the divider panel and connected to a paddle actuator which biases the paddle toward a neutral position, i.e., the first position so that unless an external force is applied to the paddle, it will remain in the first position ensuring that the upper and lower chambers have a first predetermined relative volume ratio, preferably substantially the same volumes. To bias the paddle toward the first position, the paddle actuator is advantageously a one way cylinder.

In another aspect of the invention, a linearly reciprocating packer is connected to one end, preferably the first end of the hopper, for selectively moving and compacting refuse in one of the substantially horizontal chambers. A bucket associated with a second horizontal refuse chamber is connected to and cooperatively movable with the packer for movement between a first position and a second position. A blade is pivotally connected to the hopper for pivotal movement between a first position retaining refuse within the upper chamber and a second position which prevents refuse from being emptied into the inner cavity. Movement of the blade from the second position to the first position results in the blade sweeping residual refuse from the bucket when the bucket is in the second position. Preferably, the blade is pivotally mounted to the hopper so as to pivot about a generally horizontal axis.

The bucket preferably has a generally U-shaped configuration, when viewed in longitudinal cross-section, which is open to receive refuse therein when the bucket is placed in the horizontal first position. This bucket configuration allows the blade to easily engage the curved inner surface of the bucket to remove any residual refuse remaining therein, when the bucket is positioned in the vertical second position. Advantageously, the curved outer surface of the bucket minimizes the refuse being deposited into the opening in the top of the hopper from being deposited into the wrong chamber. Instead, with a curved outer surface, the bucket assists in deflecting refuse into the proper location. The bucket advantageously has a first end pivotally connected to the divider panel and a second end pivotally connected to the packer so that the bucket cooperatively pivots between the first position and the second position in response to movement of the packer, thereby minimizing the number of actuators required.

A packer actuator is preferably provided to connect the packer and the bucket to enable them to operate in unison. This cooperative movement enables different types of refuse to be simultaneously placed into one or both of the upper and lower chambers of the refuse collection vehicle and subsequently simultaneously compressed. In addition, compaction of mixed glass and plastic refuse in a single chamber can be accomplished without having the plastic located in the upper chamber spilling into the lower chamber, and without breaking the glass commingled within the upper chamber.

DETAILED DESCRIPTION OF THE PREFERRED EMBODIMENT

The present invention now will be described more fully hereinafter with reference to the accompanying drawings, on in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
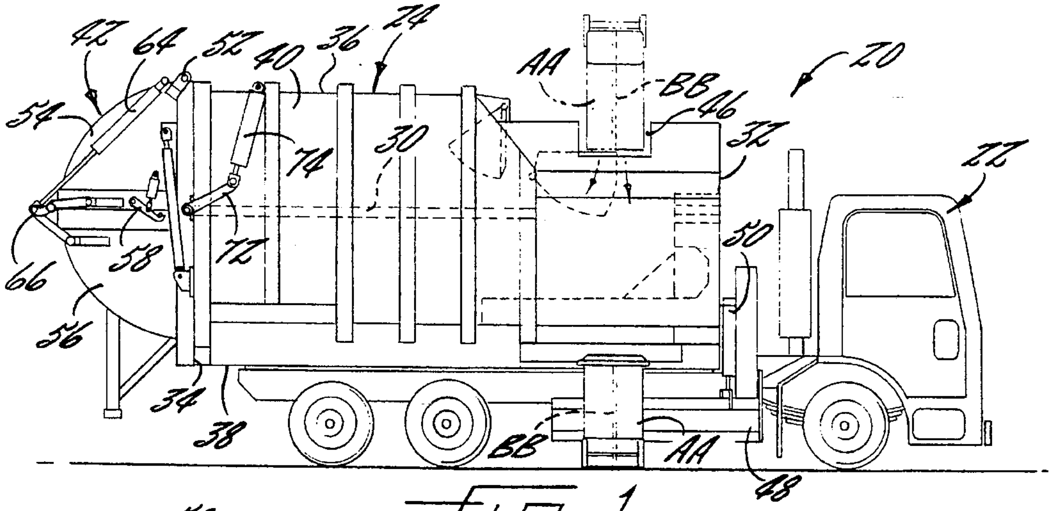
FIG. 1 is a side view, partially in phantom, of a refuse collection vehicle showing a divided refuse cart in both a receiving and a dumping position, in accordance with the present invention.

Referring more particularly to the drawings, FIG. 1 illustrates a refuse collection vehicle, generally indicated as 20, which embodies the present invention in its various aspects. As is conventional, the vehicle 20 includes an operator cab, generally indicated as 22 at the front end, and a refuse collection hopper, generally indicated as 24 mounted on the bed of the truck behind the cab. Also, in the embodiment illustrated in FIGS. 1–3, the hopper 24 is divided into two chambers, an upper chamber 26 and a lower chamber 28, by a generally horizontal divider panel 30 which extends horizontally through a central portion of the hopper.

Figure 2:
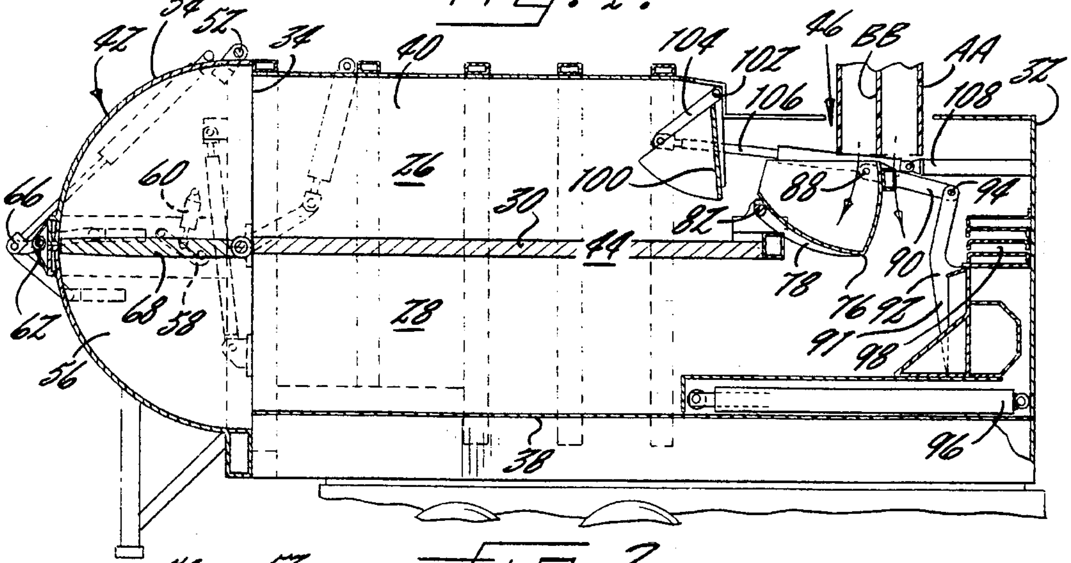
FIG. 2 is an enlarged partial cross-sectional view of the collection hopper shown in FIG. 1.

As shown in FIGS. 1 and 2, the collection hopper 24 has a generally rectangular configuration formed from a closed first end 32 located adjacent the operator cab 22, an open second end 34 located opposite the first end, a top wall 36 a bottom wall 38 and a pair of opposed side walls 40. A tailgate, generally indicated as 42 is pivotally connected to the second end 34 of the hopper 24 to selectively cover the second end and cooperative define with the collection hopper 24 an inner cavity 44. An opening 46 is defined in the top wall 36 of the collection hopper 24 to provide access for placing refuse to the inner cavity 44.

The vehicle 20 is adapted to engage and empty refuse collection containers AA which are positioned along the roadside by homeowners, businesses, and the like. The containers AA may be of the type illustrated, for example in U.S. Pat. No. 5,119,894, the disclosure of which is incorporated herein by reference. Such containers include one side which is adapted to be engaged and gripped by the lifting mechanism of the vehicle as further described below. The container may also include a vertical internal divider wall BB which divides the interior thereof into two adjacent sides. These two sides may be designated to receive two types of waste, such as recyclables and nonrecyclables, or two different types of recyclable waste, so that the initial sorting of the waste is done by the homeowner as the waste is deposited in the container.

The vehicle supports an elongate lift arm 48 which extends longitudinally along one side of the vehicle. The lift arm 48.is mounted to the vehicle 20 by a conventional hydraulic lifting mechanism 50 as known in the art, and which is capable of moving the lift arm and the refuse cart AA between a lowered position wherein the lift arm extends longitudinally along the side of the vehicle and a raised dump position wherein the lift arm extends longitudinally along the opening 46 of the hopper 24. The lift arm 48 and the lifting mechanism 50 are preferably similar to that described in U.S. Ser. No. 08/349,625, filed Dec. 5, 1995, now U.S. Pat. No. 5,513,731 and which is incorporated herein.

Figure 10:
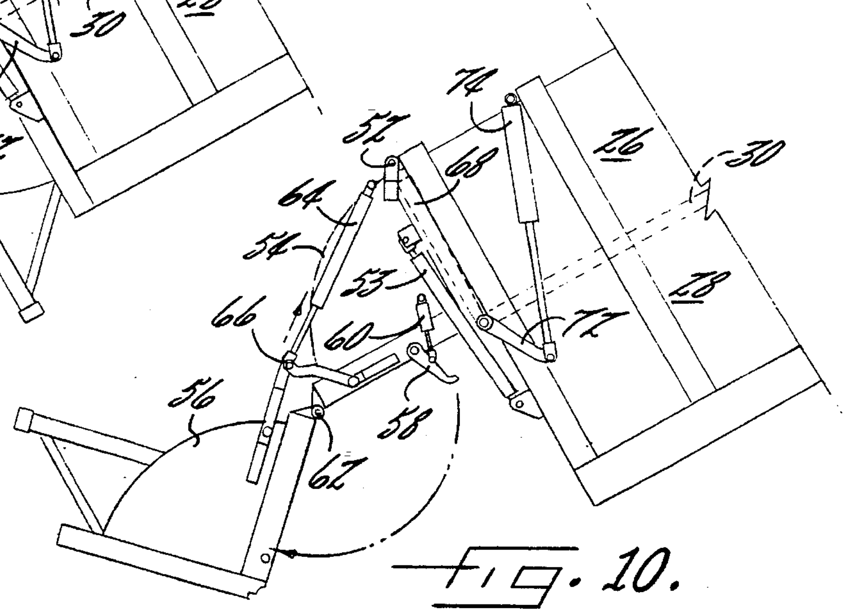
FIG. 10 is a view similar to that shown in FIG. 9 with the second section pivoted to the open position so as to expose the lower chamber for dumping refuse therefrom.
Figure 11:
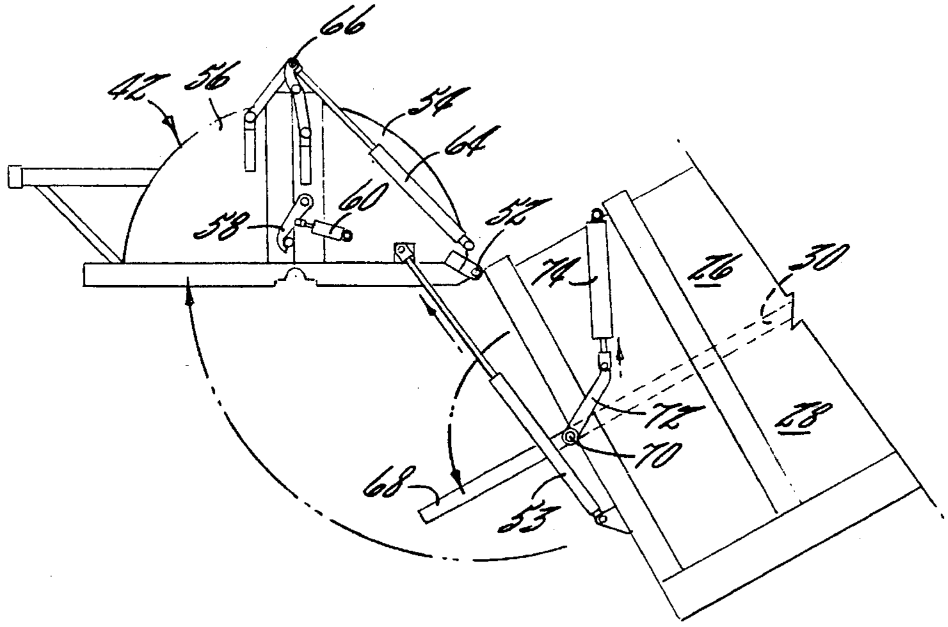
FIG. 11 is a view similar to that shown in FIG. 10 showing the first section in the open position so as to expose the second end of the hopper enabling the upper chamber and the lower chamber to be simultaneously emptied.
Figure 12:
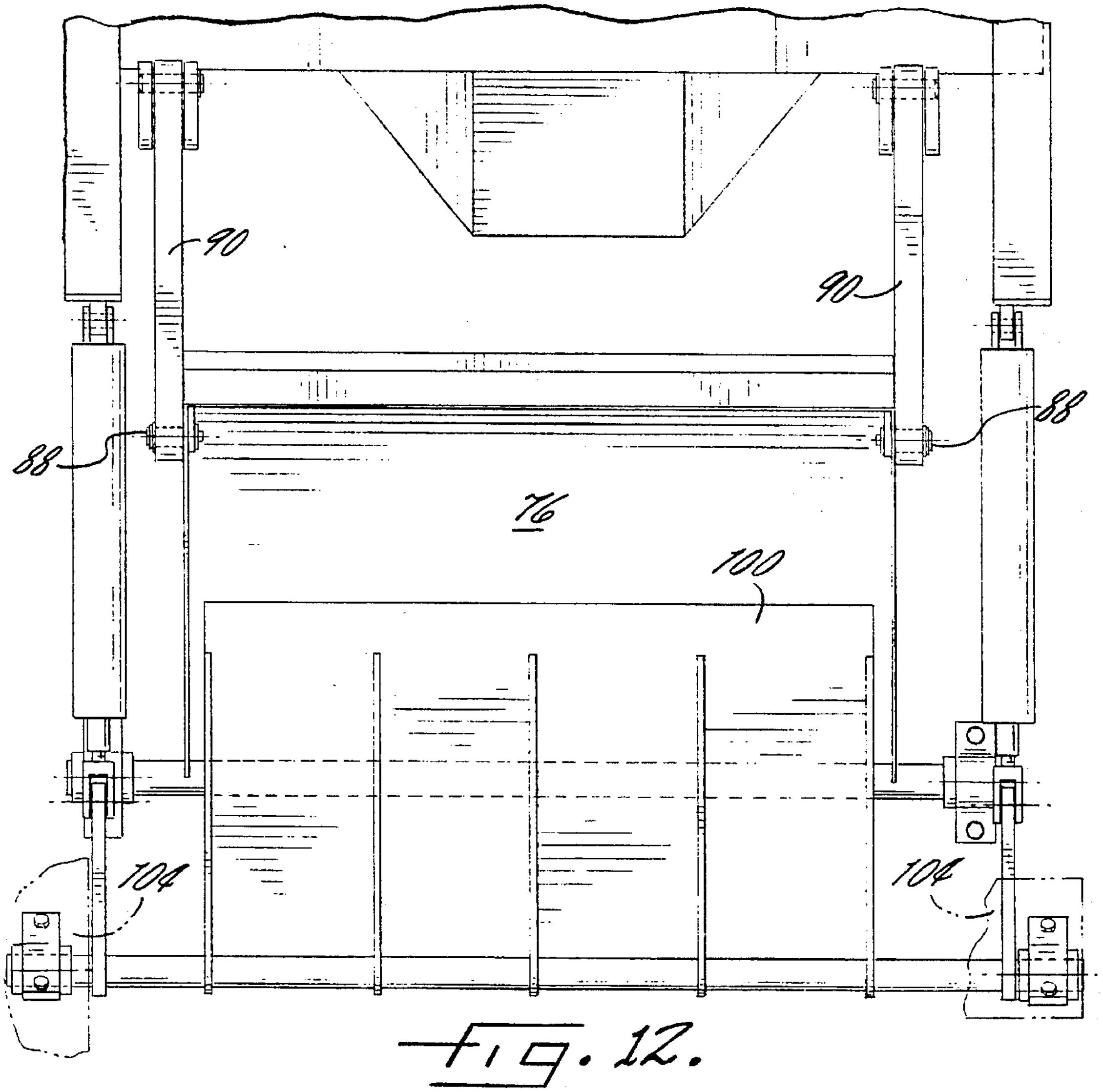
FIG. 12 is an enlarged top plan view of the bucket and the blade.

In the embodiment shown in FIGS. 1–3 and 912, 12, the tailgate 42 is a split tailgate that permits the upper and lower chambers 26 and 28, respectively to be individually or simultaneously emptied. The tailgate 42 is pivotally attached by a pivotable connector 52 to the second end 34 of the collection hopper 24. The pivotable connector 52, cooperates with a tailgate actuator 53, attached between the tailgate and the second end of the hopper 24, to allow the entire tailgate 42 to pivot between a closed position overlying or adjacent to the second end of the hopper, shown in FIGS. 1–3 and 9, and an open position or extending outwardly of the second end of the hopper, as shown in FIG. 11. This arrangement allows at least one of the upper chamber 26 and the lower chamber 28 to be emptied and, if desired, allow both chambers to be simultaneously emptied. The collection hopper 24 of this embodiment is pivotally connected to the bed of the truck so as to be movable between a collection position, shown in FIG. 1, and a dumping position, shown in FIGS. 10 and 11.

The tailgate 42 of this embodiment has a first section 54 and a second section 56 which cooperate to form a generally clam-shell shaped closure. Two releasable latches 58, each having a latch actuator 60, are located one on each opposed side of the tailgate to selectively secure the first and second sections of the tailgate together so that they can selectively operate in unison. As shown in FIG. 10, the two sections are pivotally connected at a generally vertical central pivotable connector 62 located horizontally between the first section 54 and the second section 56. This central pivotable connector 62 cooperates with the latch 58 and the latch actuator 60, and with a first tailgate portion actuator 64, attached between the central pivotable connector and the first portion of the tailgate 42, and further with a central hinge assembly 66, to allow the second section of the tailgate to pivot away from the second end of the hopper 24 to a position adjacent the first section, to separately open and allow separate emptying of one of the upper chamber 26 and the lower chamber 28.

Separate emptying of the upper and/or lower chambers is advantageously accomplished in accord with the invention when either the second portion 56 or the entire tailgate 42 is open, and involves the use of a paddle 68. As illustrated in FIGS. 2–5 and 9–12, the paddle 68 is a generally planar rectangularly shaped metal element which forms a movable extension of the divider panel 30. In the presently preferred embodiment, the paddle has a length of about 15 to about 25% of the divider panel 30, although other shapes and relative lengths can readily be employed within the scope of the invention.

Figure 3:
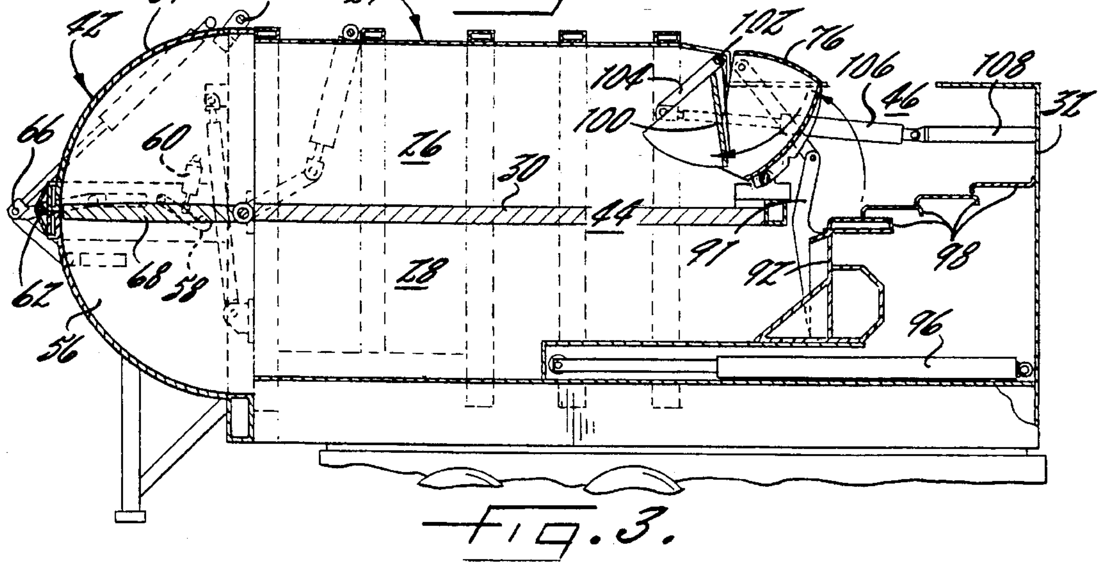
FIG. 3 is a view similar to that shown in FIG. 2, illustrating the cooperative movement of the packer and bucket.
Figure 4:
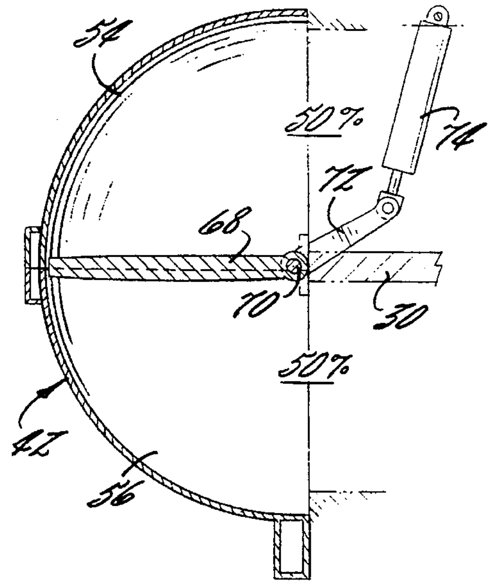
FIG. 4 is an enlarged side view of a portion of the hopper and the tailgate, in partial cross section, showing the paddle in the first position.
Figure 5:
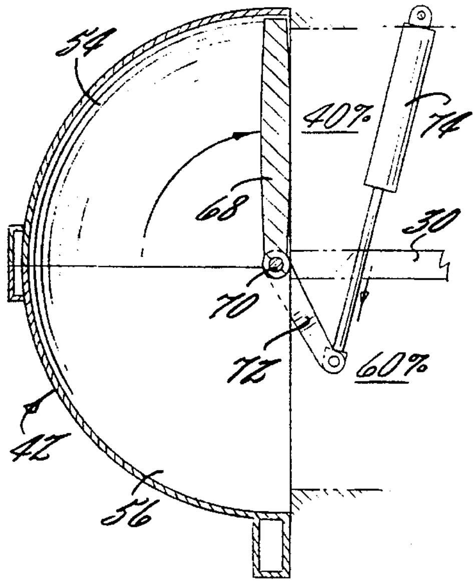
FIG. 5 is a view similar to that shown in FIG. 4 showing the paddle in the second position.

As best seen in FIGS. 4, 5, and 11, the paddle 68 is pivotally attached to the divider panel 30 about a paddle pivot axis 70. A paddle linkage 72 is attached between one end of the paddle 68 and one end of a paddle actuator 74. In turn, the second end of the paddle actuator is connected to the hopper 24. The paddle linkage 72 and the paddle actuator 74 combine to exert a continuously uniform pressure against the paddle 68. For the paddle 68 to move about the paddle pivot axis 70 from a generally horizontal first position, shown in FIGS. 2–4 and 11, to a generally vertical second position shown in FIGS. 5, 9, and 10, requires the compacted refuse contained within the lower chamber 28 to overcome the pressure exerted by the paddle linkage 72 and the paddle actuator 74. The pressure exerted against the paddle 68 may be adjusted within a predetermined range. It is to be understood that the paddle 68 may alternatively or concomitantly also be movable to a different vertical position which overlies or covers the lower chamber (i.e, forming an angle of greater than or less than 90° with respect to the divider panel 30) in accordance with the present invention. Alternatively, the paddle 68 may be movable about the paddle pivot axis 70 a full 180° so as to selectively cover either the upper or lower chamber as desired. In such an embodiment, the paddle actuator 74 is a different actuator, eg., a linearly reciprocating actuator, which is capable of moving the paddle through the entire 180°.

Preferably, in the first position, the paddle is generally in the same plane i.e., longitudinally aligned with, the divider panel 30, so that the relative volumes of the first and second chambers 26 and 28 respectively, are substantially the same or equal. However, as the paddle 68 is pivoted toward the second position, by pressure from the compacted refuse overcoming the opposed pressure from the actuator 72, the plane of the paddle becomes ever increasingly angularly offset from the divider panel 30, so that the relative volumes of the upper chamber 26 and the lower chamber 28 become increasingly different. Thereby, creating a backpacking effect resulting in a more effective compaction of the load and consequently a more effective use of hopper space.

The paddle actuator 74 in the presently preferred embodiment is a one-way actuator which biases the paddle 68 toward the first position. Advantageously the sensitivity of the paddle actuator 74 is adjustable to allow movement thereof in response to a selectable pressure on the paddle 30 so that when a predetermined amount of compaction of the refuse occurs in the designated chamber, in this instance lower chamber 28, the paddle 68 begins to move toward the second position. Consequently, the operator may adjust the amount of desired compaction depending on the nature of the refuse contained therein. Additionally, the compacting member supplies the force for moving the paddle through simplifying construction. Moreover, the relative volumes can "self-adjust" in response to the actual volumes of refuse placed into the refuse vehicle.

A preferred alternative embodiment of the device includes the actuatory 74 operating as an active actuator capable of moving the paddle 68 in the presence or absence of refuse in one or both of the chambers. In such case movement of the paddle 68 may be selectively controlled by the operator to control which of the upper chamber 26 and/or lower chamber 28 is to be emptied during the dumping cycle. The operator can, depending upon the position of the paddle 68, and upon the position of the tailgate 42, i.e., whether the second section 56 of the tailgate 42 or both the first section 54 and the second section are moved to the open position, empty just the lower chamber 28 or simultaneously empty both the upper chamber 26 and the lower chamber.

In one embodiment of the invention, a bucket 76 having a generally U-shaped configuration, with a curved inner surface, is pivotally mounted within the inner cavity 44 of the collection hopper 24. As shown best in FIGS. 1, 2, and 6–8, the bucket 76 has an arcuate rib 78 attached to a portion of an outer surface thereof. The rib 78 defines an aperture 80 at one end thereof for receiving a first pivot pin 82. A corresponding mounting bracket 84 is connected to a portion of the divider panel 30 and projects vertically upward therefrom. The mounting bracket 84 defines a correspondingly sized mounting aperture 86 for cooperatively receiving the first pivot pin 82.

The second end of the bucket 76 is pivotally connected by a second pivot pin 88 to a ram linkage arm 90. The ram linkage arm 90 is in turn connected via a second linkage arm 91 to a packer or compactor ram 92 by means of a ram pivot pin 94 located between the ram linkage arm and the second linkage arm. It is to be understood that another second pivot pin 88 and another ram linkage arm 90 are attached to the opposed side of the second end of the bucket 76, such that they work in unison. A linearly reciprocating ram actuator 96 is cooperatively connected to the compactor ram 92 for advancing and retracting the ram between a retracted position adjacent the first end 32 of the collection hopper 24 and an extended position, for compacting refuse.

As the packer 92 extends, a plurality of protective leaves 98 travel relative to each other so as to unfold from the stacked position shown in FIG. 2 to the extended position shown in FIG. 3. The addition of these leaves allows refuse to be emptied into the inner cavity 44 simultaneously with movement of the packer 92. The protective leaves 98 prevent refuse from falling behind the packer 92.

The cooperation between the mounting bracket 84 and the first pivot pin 82 at the first end of the bucket 76, and the ram actuator 96, the packer 92, and the ram linkage arm 90 at the second end of the bucket, allow the bucket to be pivotally mounted to the divider panel 30 within the inner cavity 44 and allow the bucket to move relative to the divider panel between a generally horizontal first position in which the opening in the bucket 76 faces upwardly towards opening 46 in the hopper allowing the bucket 76 to receive refuse (FIG. 2), and a generally vertical second position wherein the opening in the bucket faces the open end, the upper chamber 26 and forms a closure member at the front end thereof (FIG. 3).

A blade 100, having a generally rectangular configuration in plan view, is pivotally attached by a pivot bar 102 to a blade linkage arm 104. The blade linkage arm 104 is in turn pivotally connected to one end of a linearly reciprocating blade actuator 106. The other end of the blade actuator 106 is attached to a stanchion 108, which is in turn connected to the first end 32 of the hopper 24. This arrangement allows both the bucket 76 and the pucker 92 respectively, to be operated simultaneously by using only one ram actuator 96.

Figure 6:
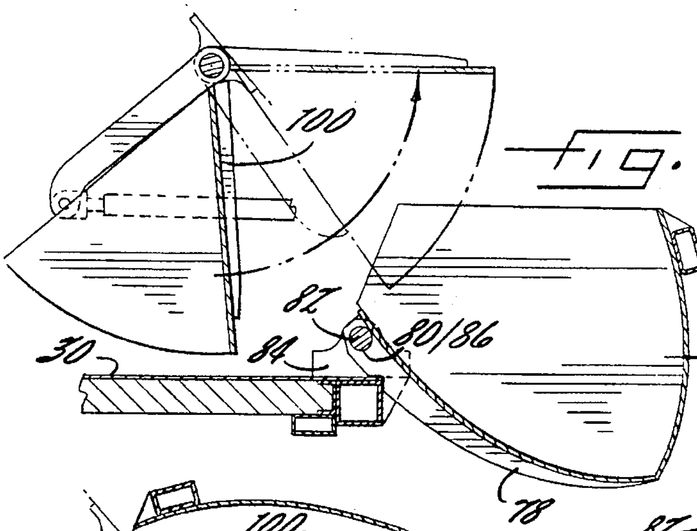
FIG. 6 is an enlarged side view of a portion of the hopper, partially in cross section, showing the bucket in the first position and the blade having moved from the first position (in phantom) to the second position.
Figure 8:
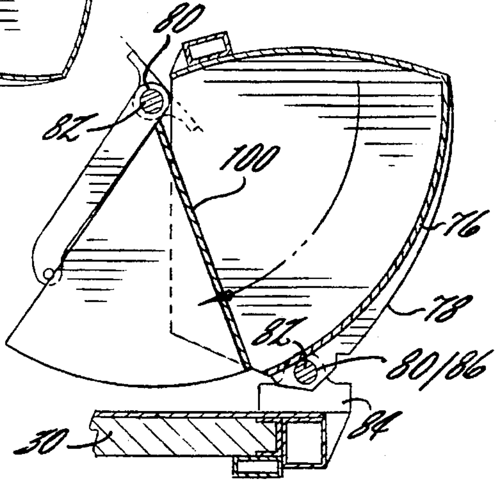
FIG. 8 is a view similar to that shown in FIG. 7, showing the blade moving from the second position to the first position, thereby removing any residual refuse from the bucket.
Figure 9:
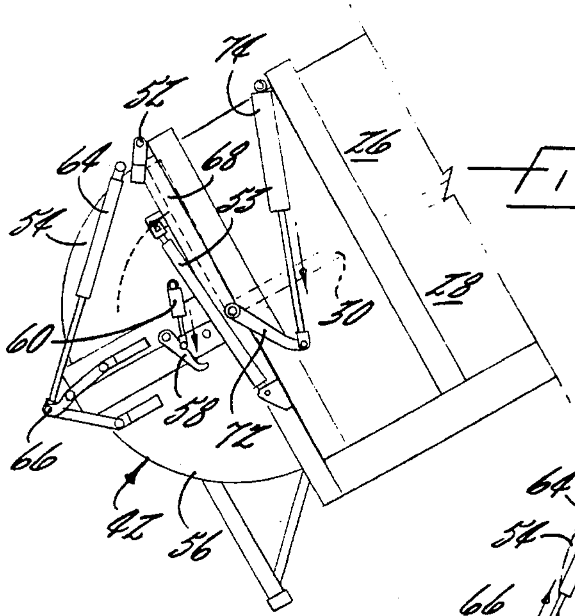
FIG. 9 is a partial side view of the second end of the refuse collection hopper raised in the dump position with the tailgate in the closed position.

The reciprocating blade actuator 106, the blade linkage arm 104, and the stanchion 108, cooperate to move the pivotal blade 100 between a vertical first position, shown in FIG. 6, where it partially or fully closes the upper chamber 26 and thus retains refuse in the upper chamber, and a horizontal second position, shown in FIG. 6 in phantom, where it prevents additional refuse from being dumped into the inner cavity 44. As shown in FIG. 8, the blade 100 is thus arranged for movement from the horizontal second position to the vertical first position to remove residual refuse from the bucket 76.

When the bucket 76 is in the generally horizontal first position, a vertical portion of the bucket acts as a vertical extension of the divider panel 30 to underlie and separate refuse received from the opening 46. The vertical portion of the bucket 76 is positioned so that it generally aligns with the divider wall BB of the refuse container AA when in the dump position. As a result, the divided refuse is directed by the vertical portion of the bucket 76 into the upper and lower chambers 26 and 28 respectively, depending upon where it was positioned in the divided refuse container.

Figure 7:
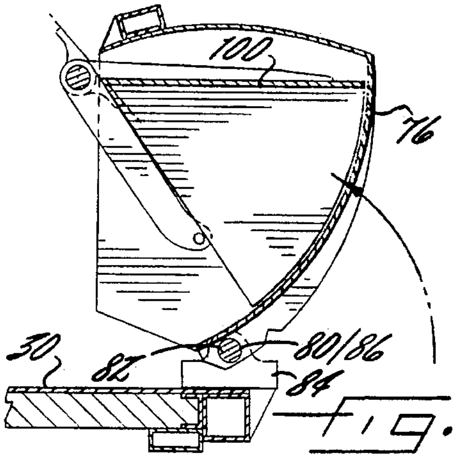
FIG. 7 is a side view similar to that shown in FIG. 6, showing the bucket moving toward the second position with the blade in the second position.

The operation of the loading and compacting cycle is best described by comparing FIGS. 1 through 3 and 6 through 8. The refuse cart AA is lifted by the lift mechanism 50 from the receiving position adjacent the refuse collection vehicle 20 shown in solid lines in FIG. 1 to a dumping position shown in phantom in FIG. 1 and shown in cross section in FIG. 2. The refuse is thereby deposited into the bucket 76, located in the generally horizontal first position (FIGS. 2 and 6). After a predetermined number of refuse carts AA have been emptied into the collection hopper 24, usually between 5 and 10 carts, the blade actuator 106 is activated to move the blade 100 from its generally vertical first position (FIGS. 1, 2, and 6) to the generally horizontal second position (FIGS. 6 in phantom, and 7). The ram actuator 96 is then extended, to thereby advance the compactor ram 92 and pivot the bucket 76 from the generally horizontal first position (FIGS. 1, 2, and 6) to the generally vertical second position (FIGS. 3, 7, and 8). The blade actuator 106 then moves the blade 100 from its second position (FIG. 7) to the first position (FIG. 6) through the path shown in FIG. 8 so as to sweep refuse from the bucket 76. Once the bucket 76 is empty and the blade 100 has returned to the first position so as to retain refuse within the upper chamber 26, the ram actuator 96 retracts, thereby returning the bucket to the first position and return the compactor ram 92 to its original position shown in FIG. 2.

Many modifications and other embodiments of the invention will come to mind in one skilled in the art to which this invention pertains having the benefit of the teachings presented in the foregoing descriptions and the associated drawings. Therefore, it is to be understood that the invention is not to be limited to the specific embodiments disclosed. Although specific terms are employed, they are used in a generic and descriptive sense only and not for purposes of limitation, and that modifications and embodiments are intended to be included within the scope of the claims.

That which is claimed:

1. A refuse collection vehicle comprising:

a refuse collection hopper mounted to the vehicle, said hopper having a closed first end and an open second end, said hopper defining and an opening for providing access to said hopper;

a tailgate connected to said hopper and defining therewith an inner cavity, said tailgate movable between a closed position for covering said second end of said hopper and an open position for uncovering at least a portion of said second end of said hopper for emptying refuse therefrom;

a divider panel mounted within said hopper for generally horizontally dividing said inner cavity into an upper chamber and a lower chamber; and a generally planar paddle located within said inner cavity forming an extension of said divider panel, said paddle being movable relative to said divider panel between at least a first position and a second position to thereby change the relative volumes of said upper and lower chamber;

wherein said paddle extends in the direction of said tailgate and cooperates therewith in each of said first and second positions to allow for selective emptying of at least one of said upper chamber and said lower chamber when said tailgate is in said open position.

2. A refuse collection vehicle in accordance with claim 1 wherein said tailgate comprises a generally convexly curved configuration so as to increase the volume of said inner cavity.

3. A refuse collection vehicle in accordance with claim 1 wherein said paddle is pivotally connected to said divider panel for pivotal movement relative thereto.

4. A refuse collection vehicle in accordance with claim 1 further comprising a paddle actuator connected between said divider panel and said paddle for moving said paddle relative to said dividing panel between said first position and said second position.

5. A refuse collection vehicle in accordance with claim 4 wherein said paddle actuator comprises a one way cylinder for biasing said paddle toward said first position.

6. A refuse collection vehicle in accordance with claim 1 wherein said divider panel being of such a length so as to extend across at least a major portion of the length of said hopper.

7. A refuse collection vehicle in accordance with claim 6 wherein said opening is located adjacent said first end of said hopper.

8. A refuse collection vehicle in accordance with claim 1 wherein said second position of said paddle is generally transverse to said divider panel.

9. A refuse collection vehicle in accordance with claim 1 wherein said tailgate comprises a first section pivotally connected to said hopper and a second section pivotally connected to said first section, wherein said second section is pivotable relative to said first section between a closed position adjacent said second end of said hopper and an open position adjacent said first section for exposing a portion of said second end of said hopper, enabling one of said upper chamber and said lower chamber to be emptied, and wherein said first section is pivotable between a closed position adjacent said second end of said hopper and an open position remote from said second end of said hopper for enabling said upper and lower chambers to be simultaneously emptied, except when said paddle is in said second position.

10. A refuse collection vehicle in accordance with claim 9 wherein said tailgate is pivotally connected adjacent an upper of portion of said second end of said hopper.

11. A refuse collection vehicle comprising:

a refuse collection hopper mounted to the vehicle, said hopper having a closed first end and an open second end, and said hopper defining and an opening for providing access to said hopper;

a tailgate connected at said second end of said hopper and cooperatively defining therewith an inner cavity;

a divider panel mounted within said hopper for generally horizontally dividing said inner cavity into an upper chamber and a lower chamber;

a packer mounted within said hopper for moving and compacting refuse contained within one of said upper chamber and said lower chamber;

a bucket connected to and cooperably movable with said packer between a generally horizontal first position and a generally vertical second position relative to said divider panel;

an actuator connected to one of said packer and said bucket for simultaneously moving said bucket and said packer, wherein the same actuator moves both said bucket and said packer; and a blade connected to said hopper for movement between a first position for retaining refuse in one of said upper chamber and said lower chamber and a second position for preventing refuse from being emptied into said inner cavity, while allowing refuse to be emptied from said bucket into said one of said upper chamber and said lower chamber.

12. A refuse collection vehicle in accordance with claim 11 wherein said blade is pivotally mounted to said hopper for pivotal movement about a generally horizontal axis, such that movement of said blade from said second position, covering said opening of said hopper, to said first position sweeps residual refuse from said bucket when said bucket is in said second position.

13. A refuse collection vehicle according to claim 11 wherein said tailgate is pivotally connected to said hopper and is movable between a closed position for covering said second end of said hopper and an open position for uncovering said second end of said hopper to expose at least one said first and second chambers to enable emptying thereof.

14. A refuse collection vehicle in accordance with claim 13 wherein said tailgate comprises a first section pivotally connected to said hopper and a second section pivotally connected to said first section, wherein said second section is pivotable relative to said first section between a closed position adjacent said second end of said hopper and an open position adjacent said first section for exposing a portion of said second end enabling one of said upper chamber and said lower chamber to be emptied, and said first section is pivotable between a closed position adjacent said second end of said hopper and an open position remote from said second end of said hopper for enabling said upper and lower chambers to be simultaneously emptied, except when said paddle is in said second position.

15. A refuse collection vehicle in accordance with claim 14 wherein said tailgate is pivotally connected adjacent an upper of portion of said hopper.

16. A refuse collection vehicle in accordance with claim 11 further comprising a blade actuator for corresponding movement of said blade in response to movement of said bucket.

17. A refuse collection vehicle in accordance with claim 11 wherein said bucket comprises a generally U-shaped configuration defining an opening for receiving refuse when in said first position, and said bucket having a generally curved inner surface for cooperatively engaging said blade when in said second position to enable residual refuse to be removed therefrom.

18. A refuse collection vehicle in accordance with claim 11 wherein said bucket includes a first end pivotally connected to said divider panel and a second end pivotally connected to said packer for enabling said bucket to correspondingly move between said first position and said second position in response to movement of said packer.

19. A refuse collection vehicle in accordance to claim 18 wherein said bucket has a generally curve configuration for deflecting refuse not intended for said upper chamber into said lower chamber.

20. A refuse collection vehicle, said vehicle comprising:

a refuse collection hopper mounted to the vehicle, said hopper having a closed first end and an open second end, said hopper defining and an opening for providing access to said hopper;

a tailgate connected to said hopper and defining therewith an inner cavity, said tailgate movable between a closed position for covering said second end of said hopper and an open position for uncovering at least a portion of said second end of said hopper for emptying refuse therefrom;

a divider panel mounted within said hopper for substantially horizontally dividing said inner cavity into an upper chamber and a lower chamber;

a reciprocating packer connected within said hopper for selectively moving and compacting refuse contained within one of said upper chamber and said lower chamber;

a bucket connected to and cooperably movable with said packer between a generally horizontal first position and a generally vertical second position relative to said divider panel;

a blade connected to said hopper for movement between a first position for retaining refuse in one of said upper chamber and said lower chamber, and a second position for preventing refuse from being emptied into said inner cavity, while allowing refuse to be emptied from said bucket; and a generally planar paddle located with said inner cavity forming an extension of said divider panel, said paddle being movable relative to said divider panel between at least a first position and a second position to thereby change the relative volumes of said upper and lower chamber;

wherein said paddle extends in the direction of said tailgate and cooperates therewith in each of said first and second positions to allow for selective emptying of at least one of said upper chamber and said lower chamber when said tailgate is in said open position.

21. A refuse collection vehicle according claim 20 further comprising a paddle actuator connected to said paddle for selectively moving said paddle relative to said dividing panel between said first position and said second position in response to the compacting of refuse by said packer.

22. A refuse collection vehicle in accordance with claim 21 wherein said paddle actuator comprises a one way cylinder for biasing said paddle toward said first position.

23. A refuse collection vehicle according to claim 20 further comprising a packer actuator connected to one of said packer and said bucket for cooperatively moving said bucket and said packer.

24. A refuse collection vehicle according to claim 20 further comprising a blade actuator for movement of said blade relative to said bucket.

25. A refuse collection vehicle in accordance with claim 20 wherein said tailgate comprises a first section pivotally connected to said hopper and a second section pivotally connected to said first section, wherein said second section is pivotable relative to said first section between a closed position adjacent said second end of said hopper and an open position adjacent said first section for exposing a portion of said second end enabling one of said upper chamber and said lower chamber to be emptied, and wherein said first section is pivotable between a closed position adjacent said second end of said hopper and an open position remote from said second end of said hopper for enabling said upper and lower chambers to be simultaneously emptied, except when said paddle is in said second position.

26. A refuse collection vehicle in accordance with claim 25 wherein said tailgate is pivotally connected adjacent an upper of portion of said second end of said hopper.

27. A refuse collection vehicle in accordance with claim 20 wherein said tailgate comprises a generally curved configuration so as to increase the volume of said inner cavity of said hopper.

28. A refuse collection vehicle in accordance with claim 20 wherein said bucket comprises a generally U-shaped configuration defining an opening for receiving refuse when in said first position, and said bucket having a generally curved inner surface for cooperatively engaging said blade when in said second position to enable residual refuse to be removed therefrom.

29. A refuse collection vehicle in accordance with claim 28 wherein said bucket comprises a first end pivotally connected to said divider panel and a second end pivotally connected to said packer for enabling said bucket to cooperatively move between said first position and said second position in response to movement of said packer.

30. An apparatus for use with a refuse collection vehicle of the type having a refuse collection hopper divided by a divider panel into two generally horizontal chambers and a tailgate movable between a closed position and an open position, defining therebetween an inner cavity, said apparatus comprising:

a generally planar paddle adapted to be connected within the divided hopper and being movable relative to said divider panel between at least a first position and a second position to thereby change the relative volumes of said chambers, and wherein said paddle extends in the direction of said tailgate and cooperates therewith in each of said first and second position to allow selective emptying of at least one of the two chambers when said tailgate is in said open position.

31. An apparatus in accordance with claim 30 wherein said paddle is pivotally connected to the hopper for selective pivotal movement relative to the divider panel.

32. An apparatus in accordance with claim 30 further comprising a paddle actuator adapted to be connected to the hopper for moving said paddle relative to the hopper between said first position and said second position.

33. A refuse collection vehicle in accordance with claim 32 wherein said paddle actuator comprises a one way cylinder for biasing said paddle toward said first position.

34. An apparatus adapted for use with a refuse collection vehicle of the type having a hopper divided into two chambers and having an opening providing access for emptying refuse into the hopper, said apparatus comprising:

a packer linearly reciprocatingly connected within the hopper for moving and compacting refuse contained within at least one of the chambers;

a bucket connected to and cooperably movable with said packer between a generally horizontal first position and a generally vertical second position relative to said packer;

an actuator connected to one of said packer and said bucket for simultaneously moving said bucket and said packer, wherein the same actuator moves both said bucket and said packer; and a blade connected to the hopper for movement between a first position for retaining refuse in one of the chambers and a second position overlying the opening for preventing refuse from being emptied into the hopper, while allowing refuse to be emptied from said bucket, and wherein movement of said blade from said second position to said first position sweeps residual refuse from said bucket when said bucket is in said second position.

35. An apparatus according to claim 34 wherein said blade includes a blade actuator adapted to be connected to the hopper for pivotally moving said blade between said first position and said second position.

36. An apparatus in accordance with claim 34 further comprising a blade actuator for cooperatively moving said blade and said bucket.

37. An apparatus in accordance with claim 34 wherein said bucket comprises a generally U-shaped configuration defining an opening for receiving refuse when in said first position, and said bucket having a generally curved inner surface for cooperatively engaging said blade when in said second position to enable refuse to be removed therefrom.

38. An apparatus in accordance with claim 34 wherein said bucket comprises a first end pivotally connected to said divider panel and a second end pivotally connected to said packer for enabling said bucket to cooperatively move between said first position and said second position in response to movement of said packer.

39. An apparatus in accordance to claim 38 wherein said first end of said bucket has a generally curve configuration for deflecting refuse not intended for said upper chamber into said lower chamber.

* * * * *

UNITED STATES PATENT AND TRADEMARK OFFICE
CERTIFICATE OF CORRECTION

PATENT NO. : 5,584,642

DATED : December 17, 1996

INVENTOR(S) : Huntoon

It is certified that error appears in the above-identified patent and that said Letters Patent is hereby corrected as shown below:

Col. 1, line 30, after "plastic" the comma should be a period (.).

Col. 1, line 31, "examples" should be --Examples--.

Col. 6, line 5, after "48" omit the period (.).

Col. 6, line 16, "912, 12" should be --9-12--.

Col. 8, line 52, "pucker" should be --packer--.

Signed and Sealed this

Eighth Day of April, 1997

Attest:

BRUCE LEHMAN

Attesting Officer

*Commissioner of Patents and Trademarks*